Dec. 1, 1970     H. L. CHRISTY ET AL     3,543,591
SHUTTER OPERATING MECHANISM
Filed June 9, 1969

INVENTORS.
HAROLD L. CHRISTY
HERBERT F. DIEGEL
BY
Drummond, Cahill & Phillips
ATTORNEYS

INVENTORS.
HAROLD L. CHRISTY
HERBERT F. DIEGEL

United States Patent Office 3,543,591
Patented Dec. 1, 1970

3,543,591
SHUTTER OPERATING MECHANISM
Harold L. Christy and Herbert F. Diegel, Phoenix, Ariz., assignors to Sickles, Inc., a corporation of Arizona
Filed June 9, 1969, Ser. No. 831,343
Int. Cl. F16h 27/02
U.S. Cl. 74—88                                   3 Claims

ABSTRACT OF THE DISCLOSURE

In order to achieve uniform shutter-controlled exposure through an aperture, a shutter activating mechanism is provided whereby the trailing edge and the leading edge of the shutter sweep across the aperture in the same direction when the shutter is opened and closed, respectively. The shutter operating mechanism comprises two meshed gear members and a rotary solenoid driven actuator which engages upright pins on the two gear members whereby each of the gear members is driven a quarter turn, always in the same direction, with each power stroke and each return stroke of the solenoid. The shutter is carried on a shaft common with a third gear member meshed with the first gear member with the tooth ratio between the first and third gear members providing a half turn of the shutter for each quarter turn of the first gear member.

---

This invention relates to motion translating mechanisms and, more particularly, to a mechanism for translating reciprocating arctuate movement into interrupted unidirectional rotational movement.

Conventional shutter mechanisms, of the class characterized by the pivoting of the shutters about an axis parallel to and eccentric from the aperture axis, function in a reciprocating manner; i.e., the shutter, when activated, rotates in a first direction to open the aperture and then rotates back through the same path in the opposite direction to close the aperture. Thus, it will be seen that the same edge of the shutter functions as the trailing edge when opening and the leading edge when closing such that the first portion of the aperture to be opened is the last to be closed and the last portion to be opened is the first to be closed. As a result, the amount of light passing through the aperture during transient shutter activity is not uniform. When lower speed films are used and the light intensity is not high, the reciprocating shutter does not constitute a serious defect because the transient activity of the shutter is very brief compared to the time the shutter is held in the fully open position. However, when high speed film is used and the application is critically dependent upon uniform exposure across the face of the aperture, a conventional shutter, with its reciprocating motion, cannot perform satisfactorily because the shutter opening and closing time becomes a significant factor in the total exposure period.

It is a broad object of this invention to provide an improved shutter activating mechanism.

It is a more specific object of this invention to provide a shutter activating mechanism which inherently provides uniform exposure across an aperture.

It is a still more specific object of this invention to provide a shutter mechanism in which the trailing edge and the leading edge of the shutter traverse the same path during the opening and closing phases, respectively, of the shutter movement.

The subject matter of the invention is particularly pointed out and distinctly claimed in the concluding portion of the specification. The invention, however, both as to organization and method of operation, may best be understood by reference to the following description taken in connection with the accompanying drawings of which:

Figure 1:
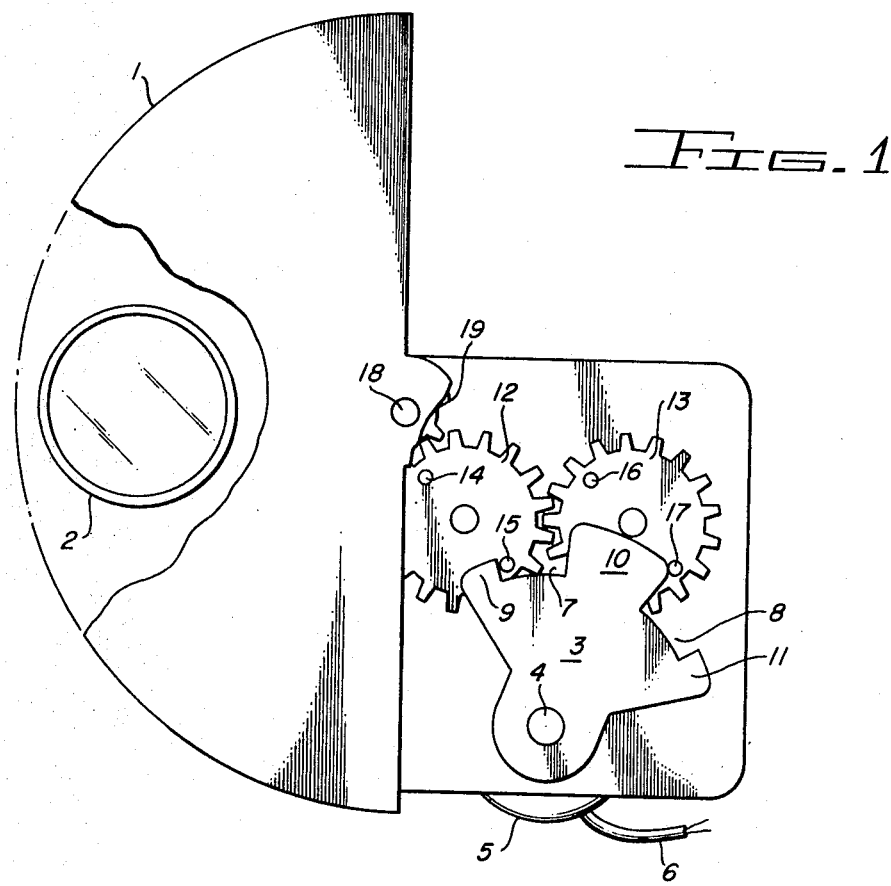
FIG. 1 is a partially cutaway view illustrating a preferred embodiment of the shutter operating mechanism with the shutter in its normally closed position.

Referring now to FIG. 1, the shutter mechanism of the present invention is illustrated in its normally closed position in which the half circular shutter 1 prevents light from passing through the aperture 2. The shutter activating mechanism includes an actuator 3 fixed to a shaft 4 which may be rotated counterclockwise through a predetermined arc by energizing a rotary solenoid 5. The predetermined arc may be determined by the internal structure of the rotary solenoid 5 in the manner well known in the solenoid arts. Further, spring loaded return to the rest position of FIG. 1 may be provided internally within the rotary solenoid 5. Therefore, it will be understood that, because of the internal structure of the rotary solenoid, not shown, the actuator 3 will be pivoted counterclockwise through the predetermined arc when an appropriate energizing signal is supplied through the conductors 6 and will pivot back to the rest position of FIG. 1 when the energizing signal is removed.

The actuator 3 has first and second notches, 7 and 8 respectively, defined by first, second and third radial extensions, 9, 10 and 11 respectively. A first gear member 12 and a second gear member 13 are meshed for contrarotation with one another parallel to and below the actuator 3. The first gear member 12 includes first and second upwardly extending pins 14 and 15, and the second gear member 13 includes third and fourth upwardly extending pins 16 and 17. As shown in FIG. 1, the pins 14 and 15 are diametrically opposed to one another on the first gear member 12 and the pins 16 and 17, similarly, are diametrically opposed to one another on the second gear member 13. The pins 14, 15, 16 and 17 extend upwardly from the faces of the first and second gear members 12 and 13 sufficiently to depth into the first and second notches 7 and 8 whereby they may be impelled or stopped by the edges of the extensions 9, 10, 11 of the actuator 3.

The shutter 1 is carried on a shaft 18 common with a third gear member 19 which is meshed with the first gear member 12. The tooth ratio between the first gear member 12 and the third gear member 19 is predetermined to provide a half turn of the shutter 1 for each quarter turn of the first gear member 12.

Figure 2:
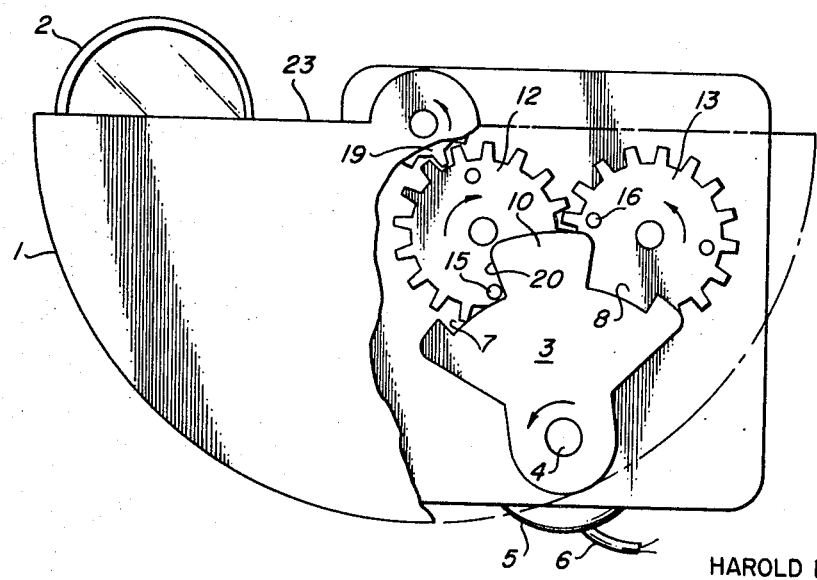
FIG. 2 is a partially cutaway view illustrating the mechanism half way through an opening function.

In FIG. 2, the actuator 3 is shown part way through its counterclockwise stroke brought about by applying a suitable energizing signal to the rotary solenoid 5 through the conductors 6. It will be observed that the left edge 20 of the radial extension 10 to the actuator 3 has moved into abutment with the second upwardly extending pin 15 to rotate the first gear member 12 in a clockwise direction. As shown in FIG. 2, the first gear member 12 has been rotated approximately one-eighth turn and, as a result, the third gear member 19 and shutter 1 have rotated approximately one-quarter turn counterclockwise to admit light to approximately one-half the aperture 2. The positions of the elements depicted in FIG. 2 are purely transitory inasmuch as the actuator 3 has not yet completed its counterclockwise stroke. The counterclockwise stroke will continue until the actuator 3 reaches the terminal position of FIG. 3, which position it will maintain so long as energy is supplied to the rotary solenoid 5 through the conductors 6.

Figure 3:
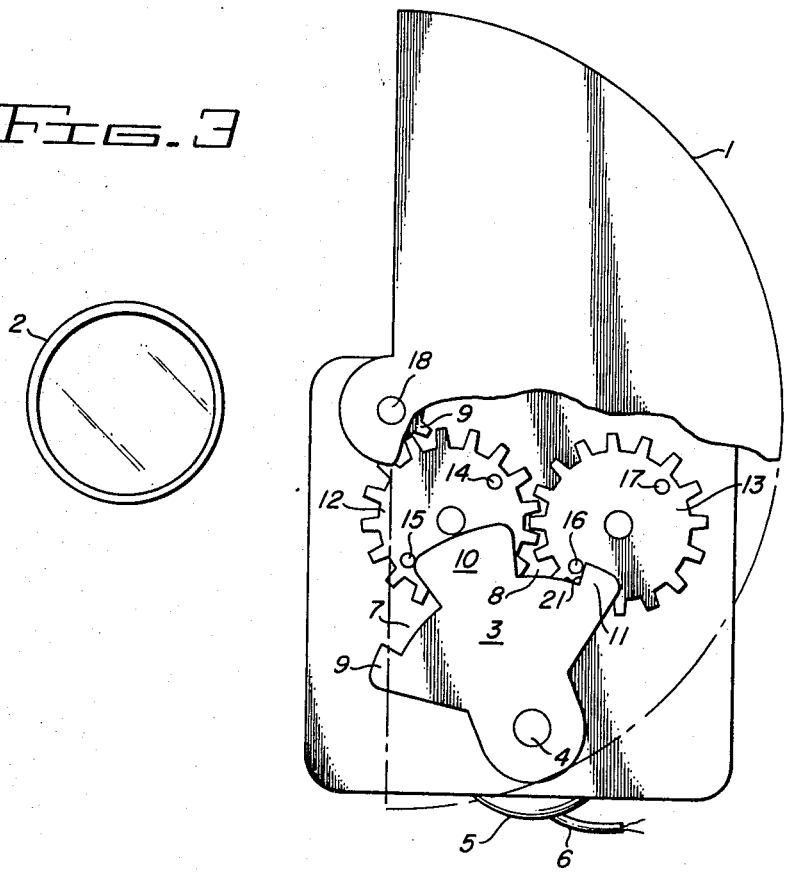
FIG. 3 is a partially cutaway view illustrating the mechanism with the shutter held stationary in its fully open position.

The terminal position of the actuator 3 brings the shutter 1 into the fully open position as clearly shown in FIG. 3. From the position of rest shown in FIG. 1, the first gear member 12 has rotated approximately one-quarter turn clockwise and the second gear member 13 will have rotated approximately one-quarter turn counterclockwise. In this position, the third upwardly extending pin 16 has locked upon the left edge 21 of the radial extension 11. This fully open position of the shutter will be maintained so long as the energy supplied to the rotary solenoid 5 through the conductor 6 is sufficient to overcome the spring return torque built into the rotary solenoid/actuator assembly.

Figure 4:
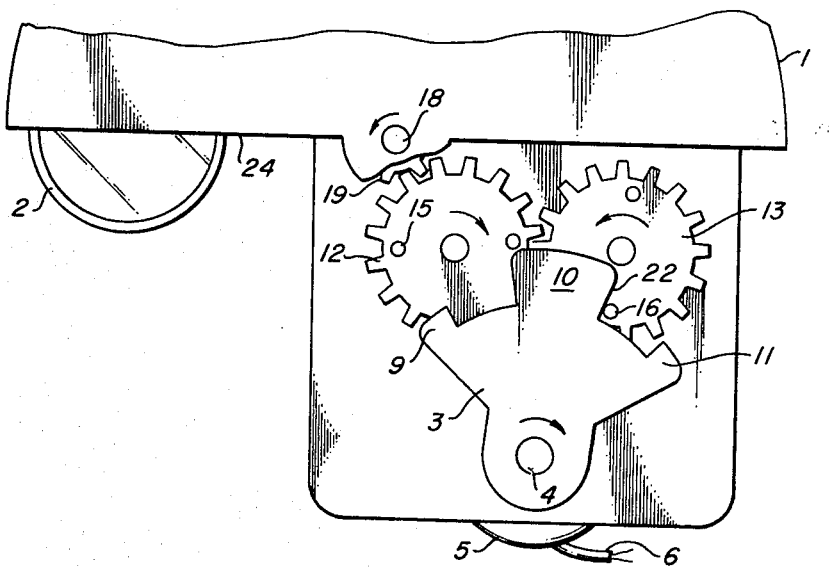
FIG. 4 is a partially cutaway view illustrating the mechanism when the shutter has moved half way through its closing phase toward reassuming the normally closed position of FIG. 1.

When the energizing signal to the rotary solenoid 5 is removed, the actuator 3 leaves its terminal counterclockwise position and pivots clockwise toward its rest position because of the above-mentioned spring loaded provision within the rotary solenoid 5. FIG. 4 illustrates the mechanism with the actuator 3 in transit between the terminal position of FIG. 3 and the rest position of FIG. 1. It will be observed that the right edge 22 of the radial extension 10 has engaged the fourth upwardly extending pin 17 on the second gear member 13 which is, therefore, being driven in the counterclockwise direction. As a result, the first gear member 12 is rotating in a clockwise direction to drive the third gear member 19 and the shutter 1 counterclockwise at twice the angular velocity of the larger gear members.

FIG. 4 like FIG. 2 depicts the shutter 1 as it is moving across the face of the aperture 2. Referring briefly back to FIG. 2, it will be observed that the trailing edge 23 of the shutter 1 sweeps across the aperture 2 from top to bottom. Similarly, as shown in FIG. 4, the leading edge 24 of the shutter 1 is sweeping across the aperture 2 from top to bottom. It will be manifest from a study of these figures that the trailing edge 23 and leading edge 24 describe the same path across the face of the aperture 2 and, inasmuch as the edges 23 and 24 are traveling at substantially the same speed during their respective operative periods, the exposure across the face of the aperture 2 will be uniform.

The actuator 3 will continue its clockwise stroke until it reaches the rest posiiton of FIG. 1 in which the shutter 1 is fully closed. The shutter mechanism is held securely in this position by virtue of the spring loaded return built into the rotary solenoid 5 as previously noted. As shown in FIG. 1, the shutter 1 is firmly held in this fully closed position by the respective locking of the pins 14 or 15 on the radial extension 9 and the pins 16 or 17 on the radial extension 10. For a full rotation of the shutter 1, the first and second gear members 12 and 13 will have rotated one-half turn such that the pins 14 and 15 and the pins 16 and 17 will have exchanged positions.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

What is claimed is:
1. A mechanism for translating reciprocating arcuate movement into interrupted unidirectional, rotational movement comprising:
   (A) a generally arcuate actuator, said actuator configured with first, second and third radial extensions defining first and second radial notches, said first notch being defined by said first and said second extensions and said second notch being defined by said second and said third extensions;
   (B) means for rotating said actuator from a rest position through a predetermined arc to a terminal position;
   (C) means for rotating said actuator back through said predetermined arc from said terminal position to said rest position;
   (D) first and second gear members meshed with one another for contrarotation, the axis of said first and second gear members being disposed generally parallel to and equidistant from the axis of rotation of said actuator;
   (E) first and second pins extending from one side of said first gear member, said first and second pins arranged parallel to and equidistant from the axis of rotation of said first gear member and defining a diameter of said first gear member;
   (F) third and fourth pins extending from one side of said second gear member, said third and fourth pins arranged parallel to and equidistant from the axis of rotation of said second gear member and defining a diameter of said second gear member;
   (G) means fixing the spatial relationship between said actuator and said first and second gear members such that said first and second pins alternately depth in said first notch during alternate excursions of said actuator from said rest position to said terminal position and said third and fourth pins alternately depth in said second notch during alternate excursions of said actuator from said terminal position back to said rest position.

2. The mechanism of claim 1 further including a third gear member meshed for contrarotation with said first gear member through an angular distance twice that described by said first gear member.

3. The mechanism of claim 1 in which said first and third extensions are the same length and said extension is longer than said first and third extensions.

References Cited

UNITED STATES PATENTS

| 3,143,848 | 8/1964 | Biemiller et al. | 74—88 X |
| 3,211,012 | 10/1965 | Murai | 74—88 |

MILTON KAUFMAN, Primary Examiner

U.S. Cl. X.R.

95—61